(12) United States Patent
Coleman et al.

(10) Patent No.: US 11,996,876 B2
(45) Date of Patent: May 28, 2024

(54) POWER SCREEN PROTECTOR

(71) Applicants: Johnathan Coleman, Houston, TX (US); Lael Alexander, Tulsa, OK (US)

(72) Inventors: Johnathan Coleman, Houston, TX (US); Lael Alexander, Tulsa, OK (US)

(73) Assignee: Johnathan Coleman, Houston, TX (US)

( * ) Notice: Subject to any disclaimer, the term of this patent is extended or adjusted under 35 U.S.C. 154(b) by 358 days.

(21) Appl. No.: 17/418,154

(22) PCT Filed: Jan. 7, 2019

(86) PCT No.: PCT/US2019/012460
§ 371 (c)(1),
(2) Date: Jun. 24, 2021

(87) PCT Pub. No.: WO2020/145933
PCT Pub. Date: Jul. 16, 2020

(65) Prior Publication Data
US 2022/0216889 A1    Jul. 7, 2022

(51) Int. Cl.
*H04B 1/3888*    (2015.01)
*H01M 10/42*    (2006.01)
*H01M 10/46*    (2006.01)
*H01M 50/202*    (2021.01)
*H02J 7/34*    (2006.01)

(52) U.S. Cl.
CPC ........ *H04B 1/3888* (2013.01); *H01M 10/425* (2013.01); *H01M 10/46* (2013.01); *H01M 50/202* (2021.01); *H02J 7/342* (2020.01); *H01M 2220/30* (2013.01)

(58) Field of Classification Search
CPC .... H04B 1/3888; H02J 7/342; H01M 50/202; H01M 10/425; H01M 10/46; H01M 2220/30
USPC ....................................................... 455/575.8
See application file for complete search history.

(56) References Cited

U.S. PATENT DOCUMENTS

| 8,010,170 | B2 * | 8/2011 | Shi ...................... | H01M 50/209 |
| | | | | 455/575.8 |
| 8,760,405 | B2 * | 6/2014 | Nam ..................... | G06F 1/1626 |
| | | | | 345/169 |
| 9,246,532 | B2 * | 1/2016 | Agnes Desodt ..... | H04B 1/3888 |
| 9,263,910 | B2 * | 2/2016 | Amano ................. | H02J 50/80 |
| 9,276,628 | B1 * | 3/2016 | Zommer .............. | H04B 1/3888 |
| 9,451,822 | B2 * | 9/2016 | Gu ....................... | F16M 11/041 |
| 9,473,192 | B2 * | 10/2016 | Fathollahi ........... | H04M 1/0202 |
| 9,769,293 | B2 * | 9/2017 | Gu ........................ | G06F 1/1626 |
| 9,819,382 | B2 * | 11/2017 | Fathollahi ............ | H04B 1/3888 |

(Continued)

FOREIGN PATENT DOCUMENTS

CN    104142710 A    11/2014

*Primary Examiner* — April G Gonzales
(74) *Attorney, Agent, or Firm* — David Guerra

(57) ABSTRACT

A rechargeable carrying case for a portable cellular communication system which protects and provides power to a mobile device is provided. The case includes a housing with a first side and second side which provides protection to the mobile device. The carrying case provides aesthetic benefits to the consumer as a sliding system allows for the mobile device to engage the carrying case. The carrying case provides extended battery charging capabilities and is adapted to use with a phone that has two distinct displays.

19 Claims, 6 Drawing Sheets

(56) References Cited

U.S. PATENT DOCUMENTS

| | | | |
|---|---|---|---|
| 9,979,430 B2* | 5/2018 | Fathollahi | H04B 1/3877 |
| 10,033,437 B1* | 7/2018 | Bimbaud | H04B 5/79 |
| 10,574,807 B2* | 2/2020 | Penke | H04M 1/7246 |
| 10,765,020 B2* | 9/2020 | Prest | H04B 1/3888 |
| 10,892,625 B1* | 1/2021 | Franklin | A45C 15/00 |
| 11,362,696 B2* | 6/2022 | Jang | H04B 1/3888 |
| 2002/0071550 A1* | 6/2002 | Pletikosa | H04M 1/0235 |
| | | | 379/433.01 |
| 2005/0130721 A1* | 6/2005 | Gartrell | H04M 1/0283 |
| | | | 455/575.8 |
| 2012/0325838 A1* | 12/2012 | Huang | G06F 1/1628 |
| | | | 220/810 |
| 2014/0043748 A1* | 2/2014 | Sartee | G06F 1/3265 |
| | | | 312/223.1 |
| 2014/0159867 A1* | 6/2014 | Sartee | G08B 5/36 |
| | | | 340/6.1 |
| 2015/0026623 A1* | 1/2015 | Horne | G06F 1/1626 |
| | | | 715/771 |
| 2015/0049426 A1* | 2/2015 | Smith | H01F 7/0252 |
| | | | 220/230 |
| 2015/0207360 A1 | 7/2015 | Adams et al. | |
| 2015/0280768 A1* | 10/2015 | Huang | H04M 1/72412 |
| | | | 455/575.8 |

* cited by examiner

POWER SCREEN PROTECTOR

BACKGROUND OF THE INVENTION

Field of Invention

This invention relates to power banks and portable charging systems for mobile devices. More specifically, it relates to a portable charging system which is suitable for a device that has two display units embedded in a single device. Consumer demand and competition in the wireless communications industry has driven a rapid evolution in cellular phone technology. As the demand for consumer electronics and streaming services has increased, one element of technology which has failed to keep pace with ancillary innovation is battery duration and charging capacity.

Although it is desirable to offer streaming services and technology suitable for 4G and 5G networks, such services can only be used for short durations of time before draining the battery. It is desirable to maximize a user's continuous time with the device before needing to leave it plugged in to a wall for multiple hours to restore the battery. While some battery drain may be attributable to poorly designed applications, it is often everyday activities which lead to the most battery use. Applications which wake the phone screen, and the increasingly high definition display screens often take up the most energy. With phone hardware becoming more powerful, battery technology has not seen a similar advancement.

A substantial number of handheld computing devices, such as cellular phones, tablets, and E-Readers, make use of a touch screen display to not only deliver display information to the user, but also to receive inputs from user interface commands. Further, the electricity required for illuminating a screen often requires more electricity than most other tasks performed on a mobile device. This can be compounded with a device that has multiple display screens.

The small form factor of handheld computing devices requires a careful balancing between the size of the power supply within the device and the ability to maintain a charged battery.

Prior art consists of portable power banks and typical wall charging devices. There is a need for a form fitting charging device which the user carries with them at all times that can continuously provide power to the device actually in use.

SUMMARY OF THE INVENTION

Primarily, the invention is a carrying case system for a mobile device. The rechargeable battery case is adapted to receive, protect, and provide power to a mobile device. The system provides for a non-removable power source inside of the case which can be charged by an ancillary power source such as a computer or wall charger. Once the battery inside of the mobile device and the battery inside of the charging case have been exhausted, a user would need to recharge the battery within the charging case and/or the mobile device in order to continue use of the mobile device.

In an embodiment, the mobile device being used within the system would have a plurality of cellular communication units, each unit having a microphone to convert sound into an electrical signal for each unit, a receiver to convert an electrical signal into sound for each unit, a display that is touch sensitive and is gesture-control enabled to display a user interface for each unit, an LED flashlight that is manually or automatically activated to provide light, a speaker to convert an electrical audio signal into a corresponding sound for each unit, a dock connector and/or USB connector to attach said portable cellular communication unit to multiple external resources simultaneously, such as a computer, musk system, keyboards, mice, or thumb drive.

The summary is provided to introduce a selection of concepts, in a simplified form, that are further described below in the detailed description. This summary is not intended to identify key features or essential features of the claimed subject matter, nor is it intended to be used as an aid in determining the scope of the claimed subject matter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. Also, it is to be understood that the phraseology and terminology employed herein are for the purpose of description, and should not be regarded as limiting.

These, together with other objectives of the invention and the various features of novelty that characterize the invention, are pointed out with particularity in the disclosure. For a better understanding of the invention, its operating advantages, and the specific objectives attained by its uses, reference should be had to the accompanying drawings and descriptive matter, in which there are illustrated preferred embodiments of the invention.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
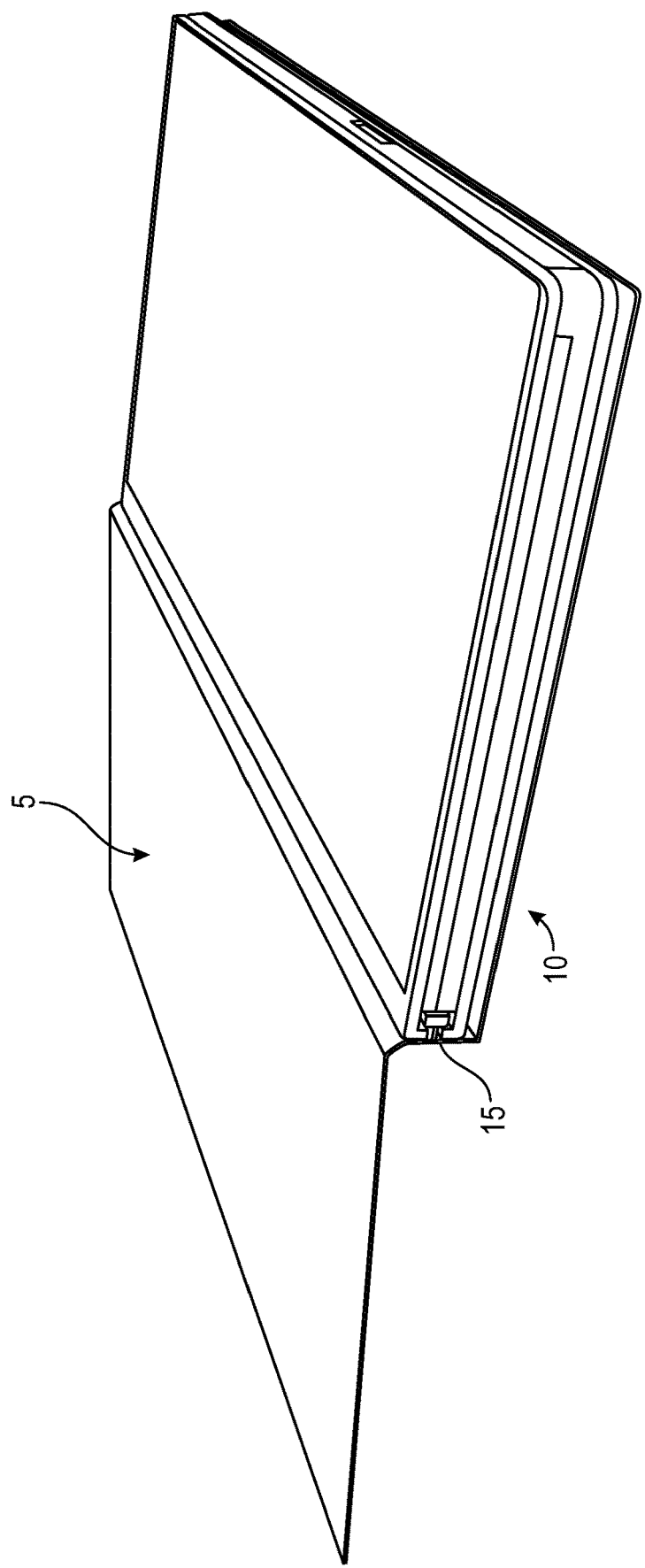
FIG. 1 shows the charging case with a top side open and the bottom side adjacent, according to an embodiment of the present invention.

Preferred embodiments of the present invention and their advantages may be understood by referring to FIGS. 1-6) wherein like reference numerals refer to like elements.

Figure 2:
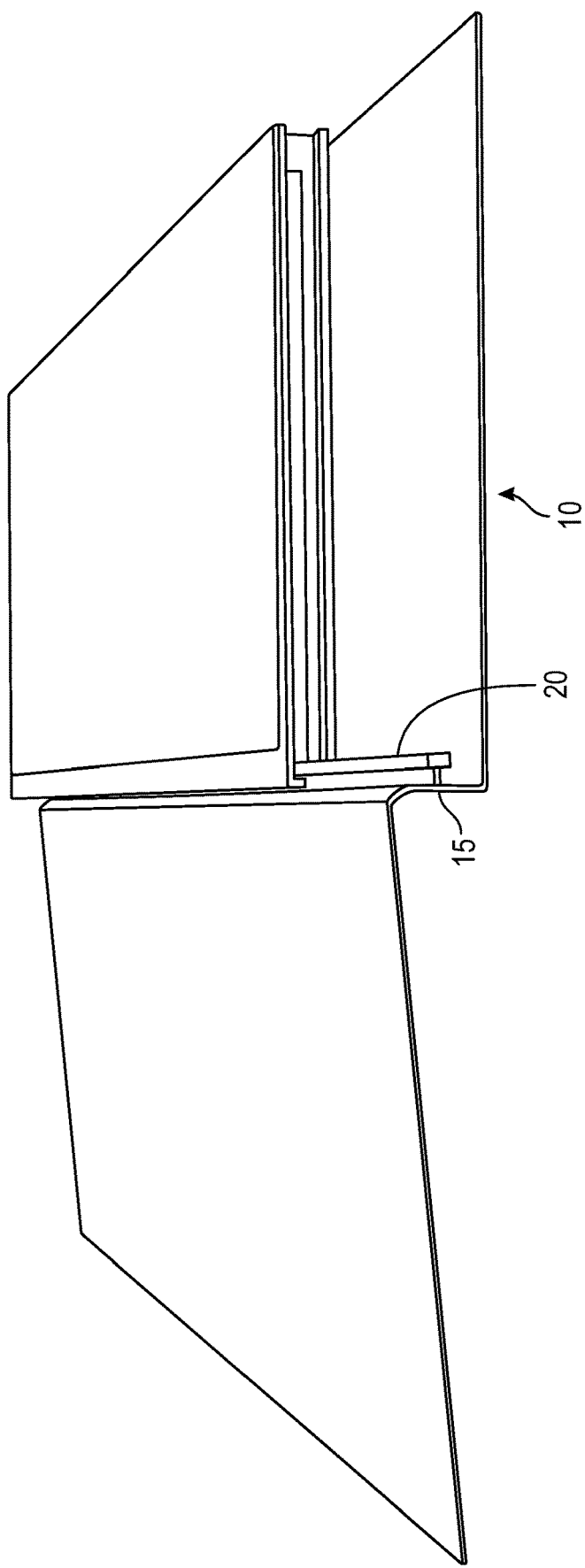
FIG. 2 shows the track system of the charging case, according to an embodiment of the present invention.

FIGS. 1 and 2 are schematic diagrams of presently preferred embodiments for a portable charging device and carrying case system. The system has a first side 5 which may be opened to display the mobile device to the user. When not in operation, the user may close the first side 5 so that it abuts a first side 5 display of the mobile device. In an embodiment, the first side 5 can have an aperture or heat sensitive clear area so that a user may touch the first side 5 display through the covering of the first side 5. The protective case can be composed of different materials, including but not limited to, leather, plastic, canvas, metal, plastic, polyurethane, and silicone. Either side of the protective case may be stylized to provide openings allowing for the speakers and ports of a mobile device to be uncovered. In other embodiments, apertures would correspond to features on the mobile device such as headphone inlet, volume controls, and access to the power button, Bluetooth switch, and other external functions on the mobile device. The apertures may be raised and or molded into portions of either the first or second side 10. In one embodiment, the button features would be made of similar materials of the first or second side 10, however in other embodiments the button features may comprise a rubber compound to improve tactile utilization of the mobile device.

The second side 10 of the system may also be opened by the user and protects the second side display of the mobile device. In an embodiment, the second side 10 is of the same material of the first side 5, however in other embodiments either side could be made of a different material. Further, the second side 10 may have an aperture or heat sensitive area so that the user can directly touch and engage a second side display of a mobile device. The connection 15 of the track 20 is matingly engaged to the appendage 80 with connects the first 5 and second 10 sides. This connection allows the track 20 to be disposed along an interior lining of the system and protrudes from the binding appendage.

FIG. 2 shows the track 20 in which the mobile device may slidingly engage the carrying system. There are numerous embodiments considered herein for the track 20 system. The carrying case may comprise a male part which can slidingly engage a phone that has the female counterpart so that the mobile device and carrying case are matingly attached. In an embodiment, the charging port may be disposed along the track 20 in a series of connected positions. The charging port may comprise 4 or more gold and/or copper charging pins 30 which discharge power to the mobile device. In an embodiment, the charging port may be less than 4 charging pins 30 and may be located somewhere other than the track 20 system. The track 20 system is adapted so that the phone may slide into the carrying case from either direction in an up or down fashion. In an alternative embodiment, there may be a mechanism in place designed to lock the mobile device or phone into the carrying case so the mobile device will not fall out inadvertently.

Figure 3:
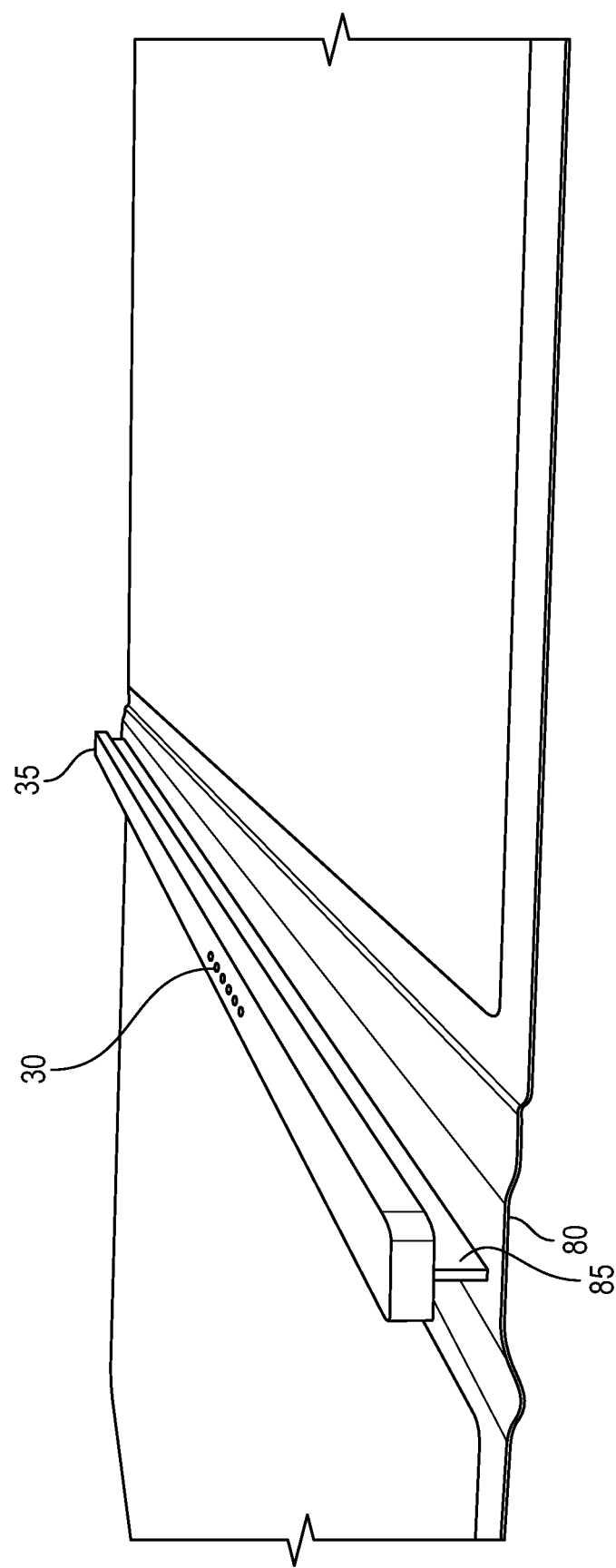
FIG. 3 shows the primary power supply connector pins, according to an embodiment of the present invention.

FIG. 3 depicts a pictorial representation of an embodiment wherein the charging port 30 is disposed on the upper surface 35 of the track 20. In yet another embodiment, the charging point is disposed on a lateral surface 85 of the track 20. In alternative embodiments, there may be a plurality of charging ports placed on either the top surface or either lateral surface of the track 20 which can act independently to provide power to either of a first or second display.

Figure 4:
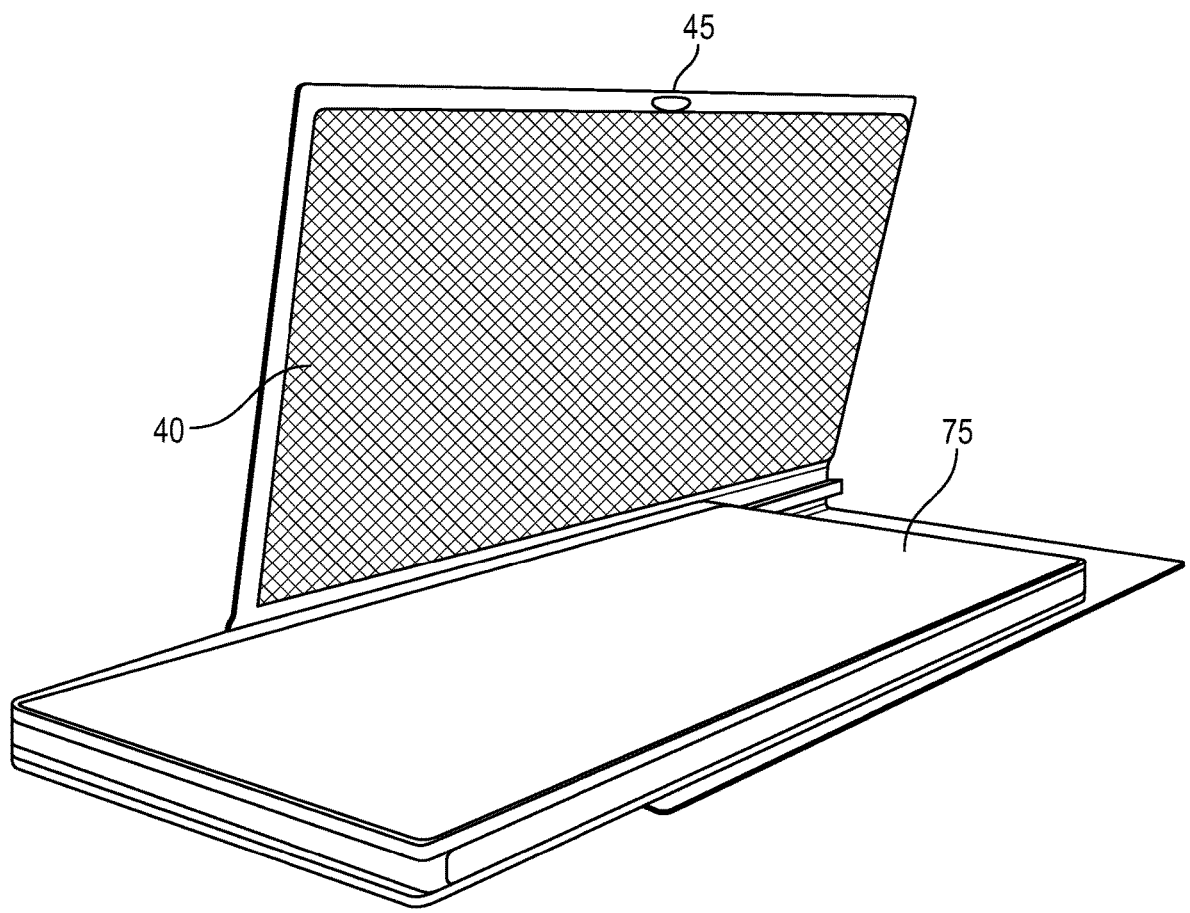
FIG. 4 shows the modular battery cell power supply, according to an embodiment of the present invention.

FIG. 4 provides a preferred embodiment wherein the battery 40 encompasses substantially all the underside of the first side 5. The battery may extend to the outer perimeter of the first side 5 and may be modular depending on various sizes of power storage capacity. It is an object of the present invention to include various battery sizes which range up to 41000 mAh. In a preferred embodiment, the power storage is 20000 mAh. The battery may also be capable of providing power at rates of 5V charging with 1 Amp, 2 Amp charging, or quick charge with up to 3 Amps. There may be a bumper portion between the outer edge of the battery and the outer ridge of the first side 5. Further, there may be a buffer which extends perpendicular to the battery so as to avoid scratching or breaking the display screen 75 of the mobile device.

The battery may be of varying thickness and may be made of lithium ion, nickel cadmium, nickel metal hydride, lithium ion polymer, lithium polymer, lead acid, or any other type of rechargeable materials. The case may have a built in charging dock so as to recharge the carrying case battery instead of being charged via a cable.

Figure 5:
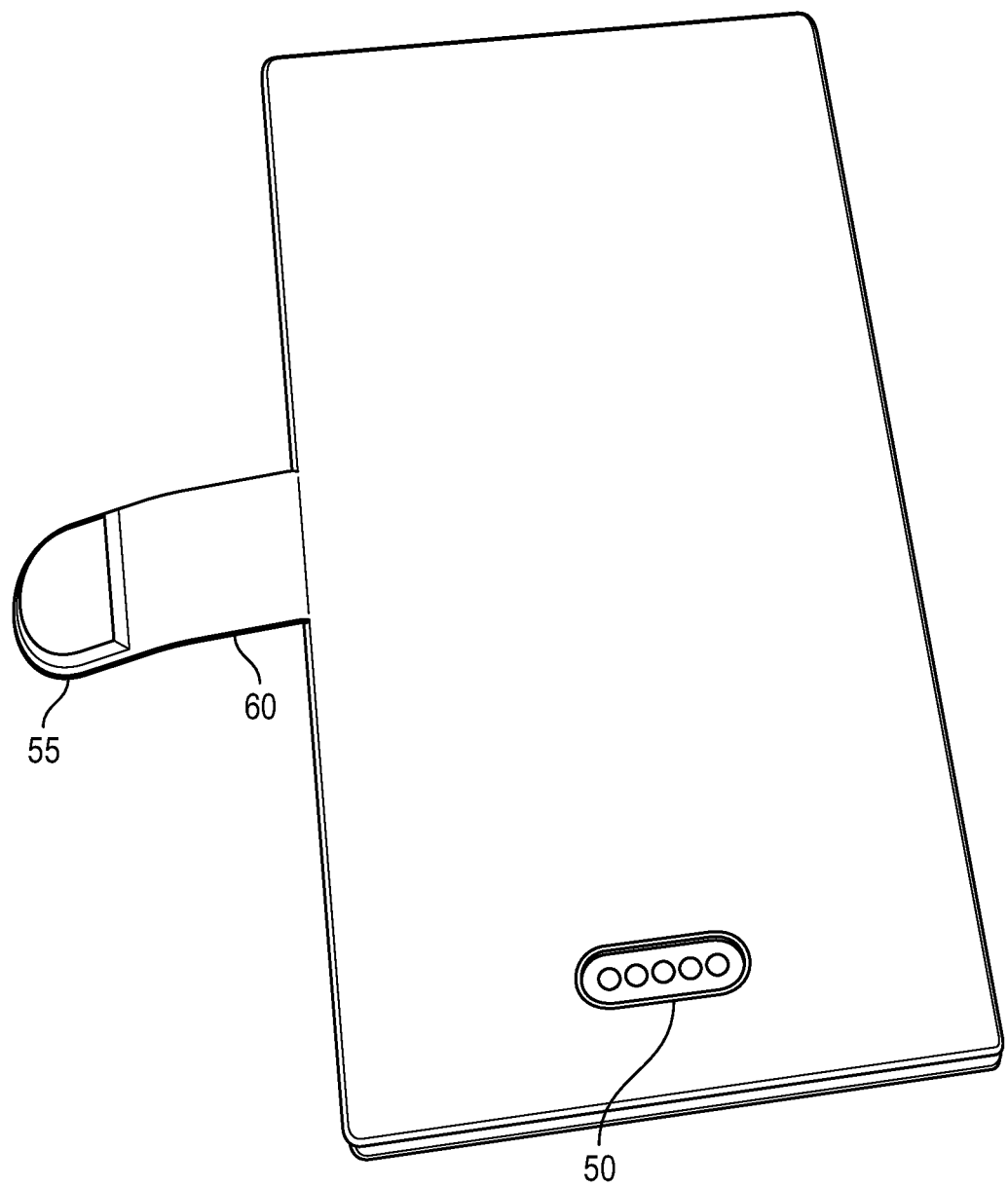
FIG. 5 shows the battery cell power supply, according to an embodiment of the present invention.
Figure 6:
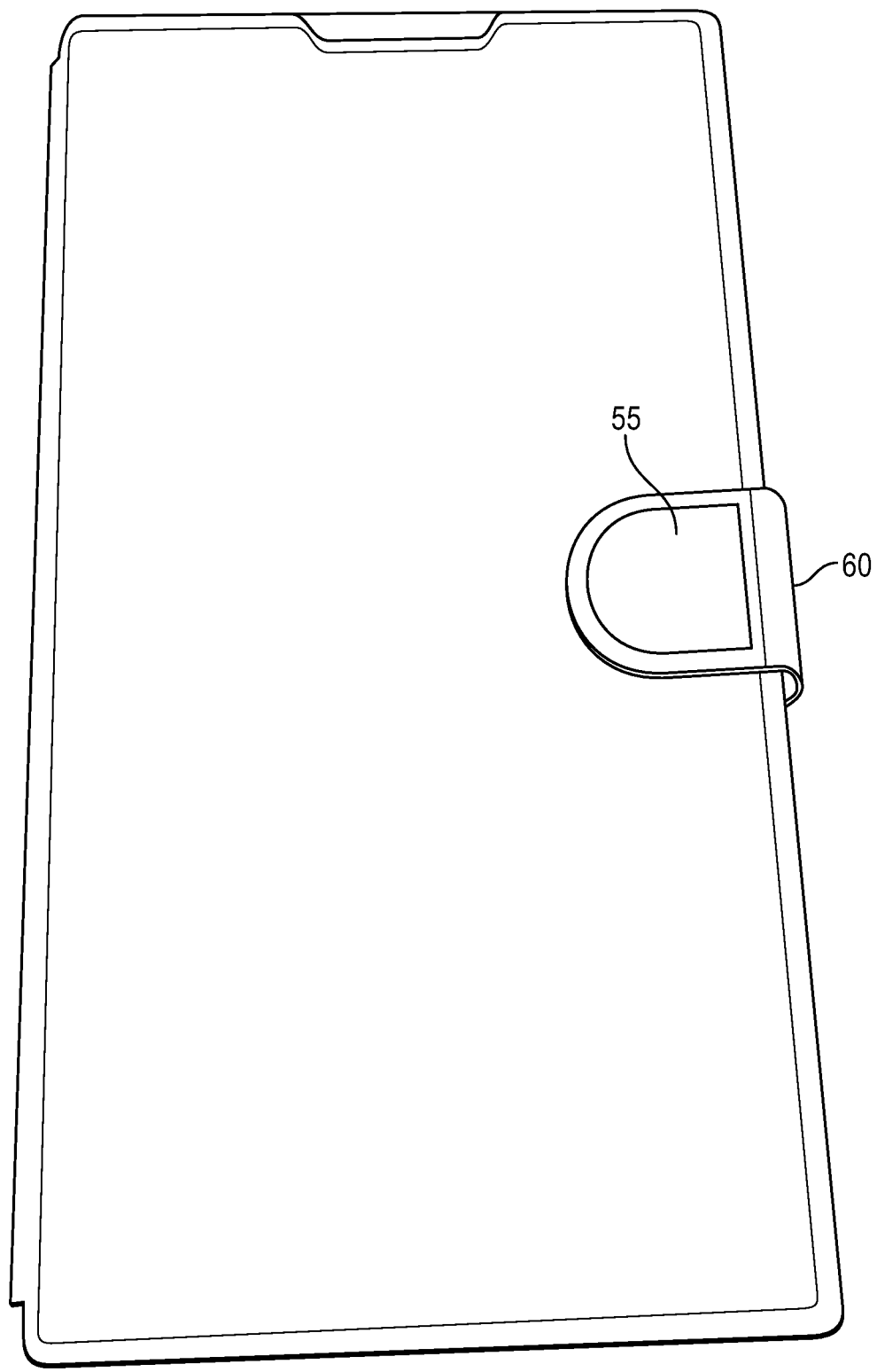
FIG. 6 shows the charging case in a closed position, according to an embodiment of the present invention.

FIG. 5-6 provides a plane view of the exterior of the charging system. In an embodiment, the charging station 50 that provide power to the battery of the carrying case is disposed on the exterior surface of the case. In alternative embodiments, the charging station can be charged wirelessly, USB, or other charging mechanisms. The carrying case may also have a flap 60 with an attachment mechanism 55 such as a magnet that can close the carrying case around the mobile device when not in use. The flap extends from either a first side 5 or second side and can strap across the mobile device to an attachment means on the opposing first or second side via a clip, magnet or other hook and loop fastener means.

In an embodiment, a rechargeable battery case system provides power to a mobile device that is built of a housing with multiple side screen protectors. A track 20 is disposed along the interior of the first and second side 10 which may be hingedly attached or coupled to the first and second side 10. In an embodiment, the housing has a biasing means to move the first side 5 or second side 10 into an open or closed position. In an embodiment, the track 20 may form a middle part of a binding appendage wherein the track 20 traverses the entire case from a top side to a bottom side. The track 20 is adapted with grooves, wheels, and or apertures to receive a mobile device. The housing further comprises a battery which provides power to the mobile device. The battery case also has at least one port to electrically transmit power from the battery to the mobile device and is capable of receiving electrical current from an external power source. The case would allow for a mobile device to be continuously powered for up to seven days. It is an object of the present invention that the carrying case would constantly be engaged with the mobile phone throughout the duration of use and ownership.

The battery case system would also have a magnetic appendage 45 or clip that allows for coupling of the screen protector sides to stay in a closed position surrounding the mobile device. On the exterior of the case, an LED display is embodied which can indicate the amount of power remaining in the case battery. The battery can be charged wirelessly, through solar power, or other common charging mechanisms such as USB, micro USB, or lightning chargers.

In another embodiment, the battery case has a processor which has memory stored in RAM capable of executing instructions to selectively discharge power from the battery to a first or second display of a mobile device. The processor of the battery housing could communicate with the phone to determine either display side's current or anticipated power usage. In one embodiment of the charging system, computer-readable medium that stores computer-executable instructions that, when executed by at least one processor, perform a method to selectively discharge power to either of the mobile device displays.

The present invention can be implemented on any communication device that has hardware components that can perform wireless and wired communication, such as (but not limited to)—multi-purpose pocket computers, personal multimedia devices, and tablets.

The various devices on which the applications that implement the present invention run may use one or more processors with different instruction-sets, architectures, clock-speeds, etc. and memory that may include high speed random access memory and may include non-volatile memory, such as one or more magnetic disk storage devices, flash memory devices, and other kinds of solid state memory devices.

Display means used by these devices may use LCD (liquid crystal display) technology, LED (light Emitting Diode) technology, CRT (Cathode ray tube) technology, or LPD (light emitting polymer) technology, or any other display technologies.

Connectivity of these devices with networks, such as the Internet, an intranet and/or wireless network, such as cellular telephone network, a wired or wireless local area network (LAN) and/or metropolitan area network (MAN) and/or WAN (wide area network) and other wireless communication is achieved by use of a plurality of communication standards, protocols and technologies like Bluetooth, Wireless Fidelity (Wi-Fi) and/or any other suitable communication protocol, including communication protocols not yet developed as of the filing date of this document.

The present invention maybe used to carry a device which runs on a single or variety of operating system platforms, including but not limited to OSX, WINDOWS, UNIX, IOS, ANDROID, SYMBIAN, LINUX, or embedded operating systems such as VxWorks.

The cellular systems in which this invention embodies may use one or more processors with different instruction-sets, architectures, clock-speeds, etc. and memory that may include high speed random access memory and may include non-volatile memory, such as one or more magnetic disk storage devices, flash memory devices, and other kinds of solid state memory devices.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A rechargeable battery case system for providing power to a mobile device, the case comprising:
    a housing having a first side screen protector and a second side screen protector;
    a track disposed between the first side screen protector and the second side screen protector hingedly connected to the first and second side screen protector wherein the track is adapted to receive a mobile device;
    a battery;
    at least one port located on the track, the port being configured to electrically transmit power from the battery to the mobile device; and
    an interface to receive electrical current from an external power source.
2. The battery case system of claim 1, further comprising a computer processor configured to execute computer-readable instructions to selectively discharge power from the battery to a first display or a second display of a mobile device.
3. The battery case system of claim 2, further comprising a magnetic appendage coupled to the second side screen protector and a magnetic clip coupled to the first side screen protector to fully enclose the mobile device within the battery case system.
4. The battery case system of claim 3, wherein the first and second side screen protectors further comprise an aperture wherein a user can directly contact a first and second display of the mobile device.
5. The battery case system of claim 2, wherein the battery is disposed on a bottom side of the first side screen protector.
6. The battery case system of claim 5, wherein the battery is modular.
7. The battery case system of claim 6, wherein the battery is solar powered.
8. The battery case system of claim 5, wherein the battery has up to 20000 mAh of power.
9. The battery case system of claim 5, further comprising a LED display which indicates the amount of power remaining in battery.
10. The battery case system of claim 1 further comprising a binding appendage hingedly coupled to the first side screen protector and the second side screen protector, and wherein the track includes a lateral surface protruding from the appendage, and an upper surface extending out from the lateral surface.
11. The battery case system of claim 10, wherein the port is disposed on the lateral surface or the upper surface of the track.
12. A rechargeable battery case system for providing power to a mobile device, the case comprising:
    a housing having a first side screen protector and a second side screen protector;
    a track disposed between the first side screen protector and the second side screen protector in communication with a binding appendage coupled to the first and second side screen protector wherein the track is adapted to receive a mobile device;
    a modular battery;
    an interface to receive electrical current from an external power source; and
    at least one port to electrically transmit power from the battery to the mobile device wherein the port is disposed on an upper surface of the track.
13. The battery case system of claim 12, further comprising a computer processor configured to execute computer-readable instructions to selectively discharge power from the battery to a first display or a second display of the mobile device.
14. The battery case system of claim 12, further comprising a magnetic appendage coupled to the second side screen protector and a magnetic clip coupled to the first side screen protector fully enclose the mobile device within the battery case system.
15. The battery case system of claim 12, wherein the first and second side screen protectors further comprise an aperture wherein a user can directly contact a first and second display of the mobile device.
16. The battery case system of claim 12, wherein the battery is disposed on a bottom side of the first side screen protector.
17. The battery case system of claim 12, further comprising an LED display which indicates the amount of power remaining in battery.

18. The battery case system of claim 12, wherein the track includes a lateral surface protruding from the appendage, and wherein the upper surface extends out from the lateral surface.

19. A method of selectively powering multiple electronic displays from a protective case, the method comprising the steps of:
- receiving electrical current at the protective case from a battery connected to the protective case; and
- selectively discharging the electrical current from the battery to a mobile device by way of at least one port located on a track of the protective case;
- wherein the protective case comprising a housing having a first side screen protector and a second side screen protector, and an interface to receive electrical current from an external power source;
- wherein the track being disposed between and hingedly connected to the first side screen protector and the second side screen protector, the track being adapted to receive a mobile device.

\* \* \* \* \*